Nov. 24, 1925.
E. O. BEARDSLEY ET AL
1,562,937
SPROCKET WHEEL
Filed July 21, 1923
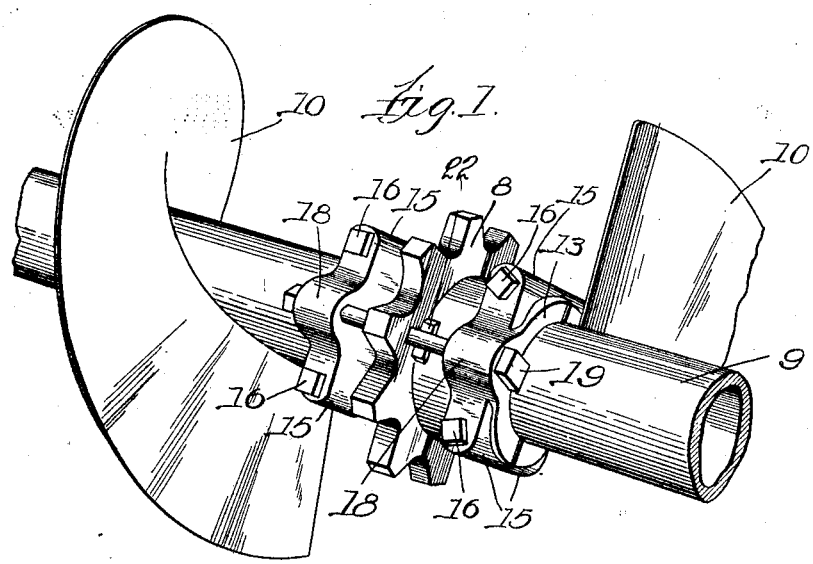
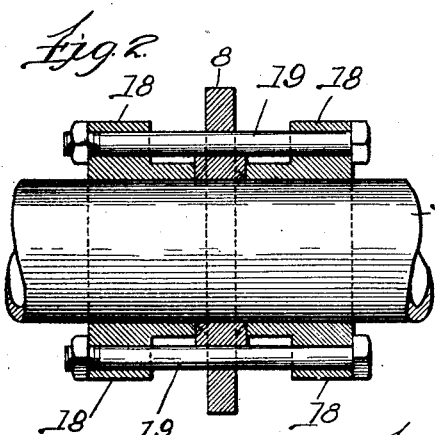
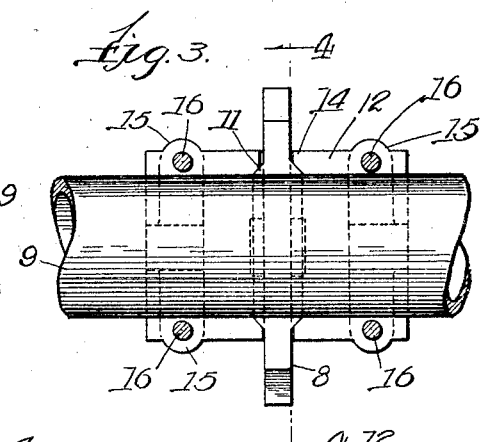
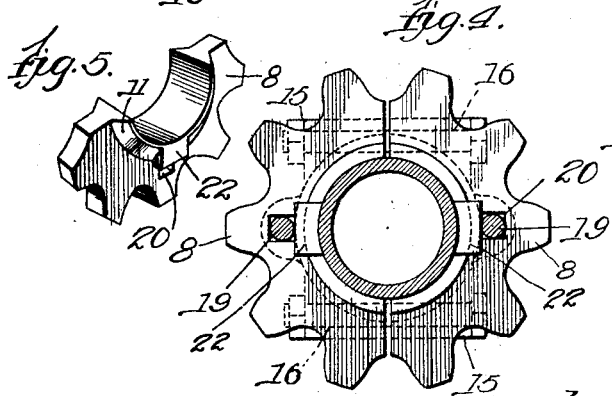
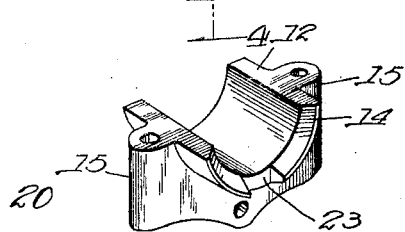
Inventors
Elmer O. Beardsley
Walter F. Piper
by Fred Gerlach
their Atty.

Patented Nov. 24, 1925.

1,562,937

UNITED STATES PATENT OFFICE.

ELMER O. BEARDSLEY AND WALTER F. PIPER, OF CHICAGO, ILLINOIS, ASSIGNORS TO THE BEARDSLEY & PIPER COMPANY, OF CHICAGO, ILLINOIS, A CORPORATION OF ILLINOIS.

SPROCKET WHEEL.

Application filed July 21, 1923. Serial No. 652,890.

*To all whom it may concern:*

Be it known that we, ELMER O. BEARDSLEY and WALTER F. PIPER, both of the city of Chicago, in the county of Cook and State of Illinois, have invented certain new and useful Improvements in Sprocket Wheels, of which the following is a full, clear, and exact description.

The invention relates to sprocket wheels. In the use of sprocket wheels in moulding machines, in which the sand causes rapid wear of the sprocket, it is occasionally necessary to replace the sprocket. Heretofore, it has been customary in practice to integrally form the sprocket and hub and, as a result, when the sprocket became worn or had to be replaced, the hub had to be replaced with the sprocket.

In practice, these sprockets, with hubs attached, are of considerable weight, and the object of the present invention is to provide an improved construction in which it is necessary to replace only a sprocket-ring when it becomes worn so that the unworn hubs need not be replaced therewith. By providing a construction of this character, the weight of the parts for replacements will be so little that they can be easily shipped by parcel-post or express and the cost of replacement will be reduced to a minimum.

The invention consists in the several novel features hereinafter set forth and more particularly defined by claims at the conclusion hereof.

In the drawings: Fig. 1 is a perspective of a construction embodying the invention applied to a sand conveyor screw. Figs. 2 and 3 are longitudinal sections in planes at right angles to one another. Fig. 4 is a side elevation of the sprocket, the collar and front of it being removed. Fig. 5 is a perspective of a section of the sprocket-ring. Fig. 6 is a detail perspective of a section of one of the collars for securing the ring on the shaft.

The invention is exemplified in a construction embodying a sprocket ring 8 which is formed of semi-circular sections so that it can be applied to the central portion of a hollow shaft 9 between the sections 10 of a conveyor, which is adapted to deliver the sand to the buckets on a chain passing around the sprocket 8, for example, as exhibited in our Patent No. 1,408,796 dated March 7, 1922. By forming the sprocket in semi-circular sections, it can be applied to the shaft 9 in places where the sprocket-wheel cannot be slipped endwise onto the shaft. The inner margin of the sprocket ring 8 is provided with bevelled portions 11 projecting from the sides thereof. A retaining collar 12 is provided at each side of the sprocket ring. Each of these collars is formed of semi-circular sections 13, the inner ends of which are countersunk, as at 14, to receive the bevelled portions 11 of the sprocket and form an interlock between the collars and the sprocket ring sections so that there will be no outward or radial movement of the ring sections relatively to shaft 9 or the sections 13. The sections of each collar are provided with ears 15 for bolts 16 which extend through said ears at right angles to the joint between the sections and are adapted to firmly clamp the sections together on shaft 9. Each collar section is provided with a perforated ear 18 and a bolt 19 extends through the ears of the collar sections at opposite sides of the sprocket-ring and through a hole 20 in one of the sprocket-ring sections. These bolts 19 are adapted to firmly clamp the sprocket-ring sections longitudinally between the collars. Each sprocket ring section is provided with a longitudinally extending lug 22 which is adapted to enter a correspondingly shaped recess 23 in one of the collar sections to form positive driving connections between the collars and the sprocket sections so that the sprocket may be driven from the shaft 9 or the shaft driven from the sprocket 8.

When the sprocket 8 becomes worn, its sections can be removed by removing bolts 19 and loosening the collars on the shaft and spreading them sufficiently so that the interfitting portions 11, 14 will be free to permit the sprocket-sections to be removed, and a new sprocket-ring or section may be substituted.

The invention exemplifies a sprocket-wheel construction which provides for replacement of the ring or portion upon which wear occurs independently of the retaining hubs or collars which do not become worn in practice.

As a result, replacement of the hubs or collars is rendered unnecessary and a corresponding saving in cost of replacement, as well as cost of shipment, is effected. The sprocket ring sections may be easily shipped and in this way the replacement of the worn sprocket is greatly facilitated.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. The combination of a sprocket ring formed of sections, each section comprising integral hub and toothed portions, a pair of collars provided with means for securing them to a shaft, bolts for securing the collars together with the sprocket ring therebetween, and driving lugs between the collars and the sprocket ring.

2. The combination of a sprocket ring formed of sections, each section comprising integral hub and toothed portions, a pair of collars provided with means for securing them to a shaft, bolts for securing the collars together with the sprocket ring therebetween, and interfitting driving elements integrally formed with said collars and ring sections respectively.

3. The combination of a sprocket ring formed of sections, each section comprising integral hub and toothed portions, a pair of collars each formed of sections and provided with means for securing them around a shaft, bolts for securing the collars together with the sprocket ring therebetween, and interfitting driving elements integrally formed with the collar sections and ring sections respectively.

4. The combination of a sprocket ring formed of sections, a pair of collars provided with means for securing them to a shaft, bolts extending longitudinally through the collars and the ring to secure them together, driving lugs between the collars and the sides of the ring, and bevelled interlocking means between the collars and the ring sections to hold the latter on the shaft and against radial movement relatively thereto.

Signed at Chicago, Illinois, this 11th day of July, 1923.

ELMER O. BEARDSLEY.
WALTER F. PIPER.